US011282006B2

(12) United States Patent
Tolica et al.

(10) Patent No.: US 11,282,006 B2
(45) Date of Patent: Mar. 22, 2022

(54) ACTION ASSIGNMENT TRACKING USING NATURAL LANGUAGE PROCESSING IN ELECTRONIC COMMUNICATION APPLICATIONS

(71) Applicant: Microsoft Technology Licensing, LLC, Redmond, WA (US)

(72) Inventors: Iuri Tolica, Oslo (NO); Olivia F Ifrim, Oslo (NO); Rezaul Hoque, Oslo (NO); Vando Pereira, Oslo (NO); Manolis Platakis, Oslo (NO); Katrine Overlie Svela, Oslo (NO); Mário Miguel Lucas Pires Vaz Henriques, Oslo (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 218 days.

(21) Appl. No.: 15/463,644

(22) Filed: Mar. 20, 2017

(65) Prior Publication Data
US 2018/0268345 A1 Sep. 20, 2018

(51) Int. Cl.
*G06Q 10/06* (2012.01)
*G06Q 10/10* (2012.01)
*G06F 3/0484* (2013.01)
*G06F 40/20* (2020.01)
(Continued)

(52) U.S. Cl.
CPC ........... *G06Q 10/063114* (2013.01); *G06Q 10/06311* (2013.01); *G06Q 10/06398* (2013.01); *G06Q 10/107* (2013.01); *G06Q 10/1095* (2013.01); *G06Q 10/1097* (2013.01); *G06F 3/04842* (2013.01); *G06F 40/166* (2020.01); *G06F 40/20* (2020.01)

(58) Field of Classification Search
CPC ....... G06Q 10/063112; G06Q 10/1097; G06Q 10/107; G06Q 10/06311; G06Q 10/06398; G06Q 10/1095
See application file for complete search history.

(56) References Cited

U.S. PATENT DOCUMENTS 7,536,314 B2 * 5/2009 Whisenhunt ..... G06Q 10/06316
705/7.26
7,571,108 B1 * 8/2009 Leban .............. G06Q 10/06316
705/7.26

(Continued)

OTHER PUBLICATIONS

Kalia, Anup et al., Identifying Business Tasks and Commitments from Email and Chat Conversations HP Laboratories, HPL-2013-4, 2013 (Year: 2013).*

(Continued)

*Primary Examiner* — Scott L Jarrett
(74) *Attorney, Agent, or Firm* — Shook, Hardy & Bacon L.L.P.

(57) ABSTRACT

Systems and methods are disclosed for meeting completion. In one implementation, a message generated in relation to a meeting is received. The message is processed to identify a first action item and a first user associated with the first action item. The first action item is assigned to the first user. Performance of the first action item by the first user is tracked. The performance of the first action item by the first user is presented within an action tracking interface.

19 Claims, 7 Drawing Sheets

(51) Int. Cl.
*G06F 40/166* (2020.01)
*G06F 3/04842* (2022.01)

(56) References Cited

U.S. PATENT DOCUMENTS

| | | | | |
|---|---|---|---|---|
| 7,679,518 | B1* | 3/2010 | Pabla | G06Q 10/109 340/309.16 |
| 8,032,553 | B2* | 10/2011 | Lippe | G06Q 10/06 707/781 |
| 8,108,206 | B2* | 1/2012 | Hufnagel | G06F 17/2881 704/257 |
| 8,112,751 | B2* | 2/2012 | Leijen | G06F 9/505 718/100 |
| 8,266,534 | B2 | 9/2012 | Curtis et al. | |
| 8,522,240 | B1* | 8/2013 | Merwarth | G06Q 10/0631 718/100 |
| 8,639,552 | B1* | 1/2014 | Chen | G06F 9/4881 705/7.21 |
| 8,914,452 | B2* | 12/2014 | Boston | G06K 9/00751 709/206 |
| 9,432,517 | B2 | 8/2016 | Youel et al. | |
| 9,436,755 | B1* | 9/2016 | Subramanya | G06F 40/30 |
| 9,461,834 | B2 | 10/2016 | Ferlitsch | |
| 9,606,977 | B2* | 3/2017 | Subramanya | G06Q 10/107 |
| 9,911,089 | B2* | 3/2018 | Saiu | G06Q 10/0631 |
| 10,140,291 | B2* | 11/2018 | Brunn | G06F 17/2809 |
| 10,163,358 | B2* | 12/2018 | Yadav | G09B 5/02 |
| 10,200,318 | B2* | 2/2019 | Kumar | G06Q 10/107 |
| 10,430,732 | B2* | 10/2019 | Zumwalt | G06Q 10/06311 |
| 10,534,520 | B2* | 1/2020 | Kulkarni | G06F 3/04842 |
| 2004/0128181 | A1* | 7/2004 | Zurko | G06Q 10/109 705/7.19 |
| 2005/0010463 | A1* | 1/2005 | Du | G06Q 10/063114 705/7.15 |
| 2006/0069599 | A1* | 3/2006 | Hatoun | G06Q 10/06 705/7.27 |
| 2006/0271381 | A1* | 11/2006 | Pui | G06Q 10/06311 705/7.13 |
| 2007/0067772 | A1* | 3/2007 | Bustamante | G06Q 10/06 718/100 |
| 2007/0106496 | A1* | 5/2007 | Ramsey | G06F 17/277 704/9 |
| 2007/0112926 | A1* | 5/2007 | Brett | G06Q 10/109 709/206 |
| 2008/0034315 | A1* | 2/2008 | Langoulant | G06Q 10/109 715/780 |
| 2008/0114809 | A1* | 5/2008 | MacBeth | G06Q 10/109 |
| 2008/0209417 | A1* | 8/2008 | Jakobson | G06F 9/4856 718/100 |
| 2009/0006982 | A1* | 1/2009 | Curtis | G06Q 10/10 715/753 |
| 2009/0006984 | A1* | 1/2009 | Bhagat | G06Q 10/10 715/760 |
| 2009/0049131 | A1* | 2/2009 | Lyle | H04L 51/04 709/206 |
| 2009/0222299 | A1* | 9/2009 | Clemenson | G06Q 10/063118 705/7.17 |
| 2009/0259718 | A1* | 10/2009 | O'Sullivan | G06Q 10/10 709/204 |
| 2009/0299811 | A1* | 12/2009 | Verfuerth | G06Q 10/06 705/7.13 |
| 2010/0083253 | A1* | 4/2010 | Kushwaha | G06Q 10/063 718/100 |
| 2010/0241483 | A1* | 9/2010 | Haynes | G06Q 10/109 705/7.18 |
| 2010/0250322 | A1* | 9/2010 | Norwood | G06Q 10/06 705/7.21 |
| 2011/0145037 | A1* | 6/2011 | Domashchenko | G06Q 10/06 705/7.27 |
| 2011/0145822 | A1 | 6/2011 | Rowe et al. | |
| 2012/0173631 | A1* | 7/2012 | Yoakum | H04L 51/26 709/206 |
| 2013/0007139 | A1* | 1/2013 | Bombacino | H04L 51/16 709/206 |
| 2013/0060593 | A1* | 3/2013 | Motoyama | G06Q 10/1095 705/7.19 |
| 2014/0081685 | A1* | 3/2014 | Thacker | G06Q 10/0631 705/7.12 |
| 2014/0082100 | A1 | 3/2014 | Sammon et al. | |
| 2014/0214404 | A1* | 7/2014 | Kalia | G06F 40/40 704/9 |
| 2014/0219434 | A1* | 8/2014 | Youel | H04M 3/56 379/202.01 |
| 2015/0033155 | A1* | 1/2015 | Camacho | H04L 51/32 715/758 |
| 2015/0205782 | A1* | 7/2015 | Subramanya | G06Q 10/107 704/9 |
| 2015/0279360 | A1* | 10/2015 | Mengibar | G06F 40/30 704/257 |
| 2015/0294220 | A1 | 10/2015 | Oreif | |
| 2015/0294259 | A1* | 10/2015 | Collins | G06Q 10/063114 705/7.15 |
| 2015/0317073 | A1* | 11/2015 | Hull | G06Q 10/103 715/753 |
| 2016/0042735 | A1* | 2/2016 | Vibbert | G10L 15/1822 704/257 |
| 2016/0063505 | A1* | 3/2016 | Bradley | G06Q 30/01 705/7.19 |
| 2016/0086116 | A1* | 3/2016 | Rao | G06Q 10/06311 705/7.21 |
| 2016/0117624 | A1* | 4/2016 | Flores | G06Q 10/06393 705/7.39 |
| 2016/0162471 | A1* | 6/2016 | Virdi | G06Q 50/01 709/206 |
| 2016/0277330 | A1* | 9/2016 | Jawaharlal | H04L 51/08 |
| 2016/0277536 | A1* | 9/2016 | Barry | H04L 67/327 |
| 2016/0292603 | A1* | 10/2016 | Prajapati | G06F 3/165 |
| 2016/0335572 | A1* | 11/2016 | Bennett | G06Q 10/06311 |
| 2016/0337413 | A1 | 11/2016 | Sallam | |
| 2016/0379641 | A1* | 12/2016 | Liu | G10L 15/265 704/235 |
| 2017/0085520 | A1* | 3/2017 | Umapathy | G06Q 10/107 |
| 2017/0154299 | A1* | 6/2017 | Kadotani | G06Q 10/063114 |
| 2017/0161258 | A1* | 6/2017 | Astigarraga | G06F 40/166 |
| 2017/0161372 | A1* | 6/2017 | Fern Ndez | G06F 17/218 |
| 2017/0193349 | A1* | 7/2017 | Jothilingam | G06N 3/006 |
| 2017/0310716 | A1* | 10/2017 | Lopez Venegas | G06Q 10/1093 |
| 2017/0372253 | A1* | 12/2017 | Nandi | G06Q 10/063112 |
| 2018/0004731 | A1* | 1/2018 | Brunn | G06F 17/2809 |
| 2018/0075008 | A1* | 3/2018 | Ganta | G06F 17/248 |
| 2018/0091459 | A1* | 3/2018 | Bastide | H04L 51/18 |
| 2018/0152407 | A1* | 5/2018 | Soni | H04L 51/04 |
| 2018/0191652 | A1* | 7/2018 | Goel | H04L 51/16 |
| 2018/0196697 | A1* | 7/2018 | Standefer | G06Q 10/101 |

OTHER PUBLICATIONS

Scerri, Simon et al., Classifying Action Items for Semantic Email Published in LREC, 2010 (Year: 2010).*

Bennet, Paul. N. et al., Detecting Action Items in Email ACM, SIGIR'05, Aug. 2005 (Year: 2005).*

Lampert, Andrew et al., Detecting Emails Containing Requests for Action The 2010 Annual Conference of the North American Chapter of the ACL, Jun. 2010 (Year: 2010).*

Khoussainov, Rinat et al., Email Task Management: An Iterative Relational Learning Approach CEAS, 2005 (Year: 2005).*

"International Search Report and Written Opinion Issued in PCT Application No. PCT/US18/022275", dated May 8, 2018, 11 Pages.

Tur, et al., "The CALO Meeting Assistant System", In Journal of IEEE Transactions on Audio, Speech, and Language Processing, vol. 18, No. 6, Aug. 2010, pp. 1601-1611.

* cited by examiner

ACTION ASSIGNMENT TRACKING USING NATURAL LANGUAGE PROCESSING IN ELECTRONIC COMMUNICATION APPLICATIONS

TECHNICAL FIELD

Aspects and implementations of the present disclosure relate to data processing and, more specifically, but without limitation, to meeting completion.

BACKGROUND

Electronic calendar applications enable users to schedule events and manage schedules. Using a calendar application, one user can schedule an event and invite other user(s) to participate in the scheduled event. The invited user(s) can be provided with information reflecting the details of the event (e.g., time, date, location, etc.).

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, Systems and methods are disclosed for meeting completion. In one implementation, a message generated in relation to a meeting is received. The message is processed to identify a first action item and a first user associated with the first action item. The first action item is assigned to the first user. Performance of the first action item by the first user is tracked. The performance of the first action item by the first user is presented within an action tracking interface.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
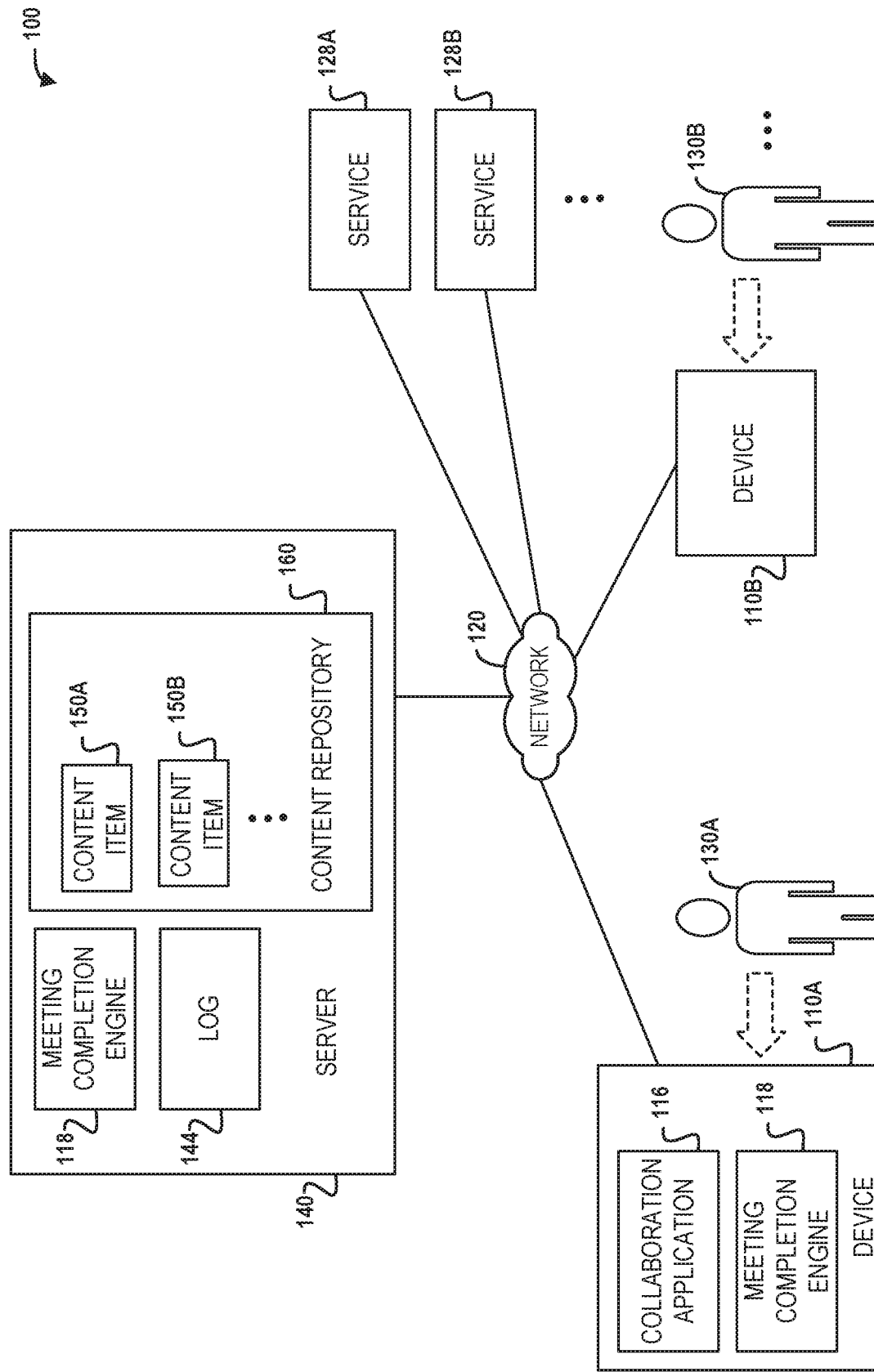
FIG. 1 illustrates an example system, in accordance with an example embodiment.

Aspects and implementations of the present disclosure are directed to meeting completion.

It can be appreciated that electronic calendar applications (and other collaboration tools, such as a suite of applications that includes a calendar application) can enable users to schedule a meeting and invite other user(s) to participate in the meeting. While such tools are effective with respect to scheduling, many shortcomings and inefficiencies remain with respect to the manner in which such user(s) follow-up on commitments, resolutions, agreements, etc., discussed during a meeting. For example, in certain scenarios one user can volunteer or be appointed as the user responsible for following up on the outcome(s) of a meeting. Such a responsible user may compose an email (or other such communication) to the meeting participants, outlining various action items discussed during the meeting. However, once such a follow-up email is sent, existing calendar applications/collaboration tools do not enable users to effectively follow up on the results of such action items (e.g., whether or not such items are actually completed). As a result, completion of many action items may be delayed (or such items can remain permanently incomplete).

Accordingly, described herein in various implementations are technologies, including methods, machine readable mediums, and systems, that enable meeting completion. The described technologies can process various follow-up message(s) (e.g., email(s) composed in response to a meeting) in order to identify action item(s) and user(s) referenced therein. Each identified action item(s) can be assigned to a user(s) that is responsible for its completion. Performance of an action item by a user can then be tracked and various notifications, reminders, etc., can be provided to facilitate completion of outstanding action item(s). An action tracking interface can also be provided, e.g., to a user that is responsible for following up on the meeting. Such an action tracking interface can provide the user with an overview of the status of action item(s) relating to various meetings, as well as detailed information relating to specific users and action items. In doing so, the described technologies can automate and enhance numerous aspects of the manner in which meetings are followed up on and action items (arising from such meetings) are completed.

It can therefore be appreciated that the described technologies are directed to and address specific technical challenges and longstanding deficiencies in multiple technical areas, including but not limited to collaboration tools, communication technologies, and tracking interfaces. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

FIG. 1 illustrates an example system 100, in accordance with some implementations. As shown, the system 100 includes various devices such as device 110A and device 110B (collectively device(s) 110). Each device 110 which can be a laptop computer, a desktop computer, a terminal, a mobile phone, a tablet computer, a smart watch, a personal digital assistant (PDA), a digital music player, a server, and the like. User 130A and User 130B (collectively user(s) 130) can each be a human user who interacts with a device 110 (e.g., device 110A and device 110B, respectively). For example, user 130 can provide various inputs (e.g., via an input device/interface such as a keyboard, mouse, touchscreen, etc.) to device 110. Device 110 can also display, project, and/or otherwise provide content to user 130 (e.g., via output components such as a screen, speaker, etc.).

As shown in FIG. 1, device 110A can include collaboration application 116. Collaboration application 116 can be an application, module, suite of applications, etc., that configures/enables the device to generate, transmit, receive and/or present communications (e.g., email or other electronic messages). Additionally, in certain implementations collaboration application 116 can include a calendar or other such time/schedule management application, such as an application that enables a user to schedule and/or manage meetings between multiple parties. In certain implementations, collaboration application 116 can include yet additional functionality, such as an application to track and manage the performance of action items.

Figure 7:
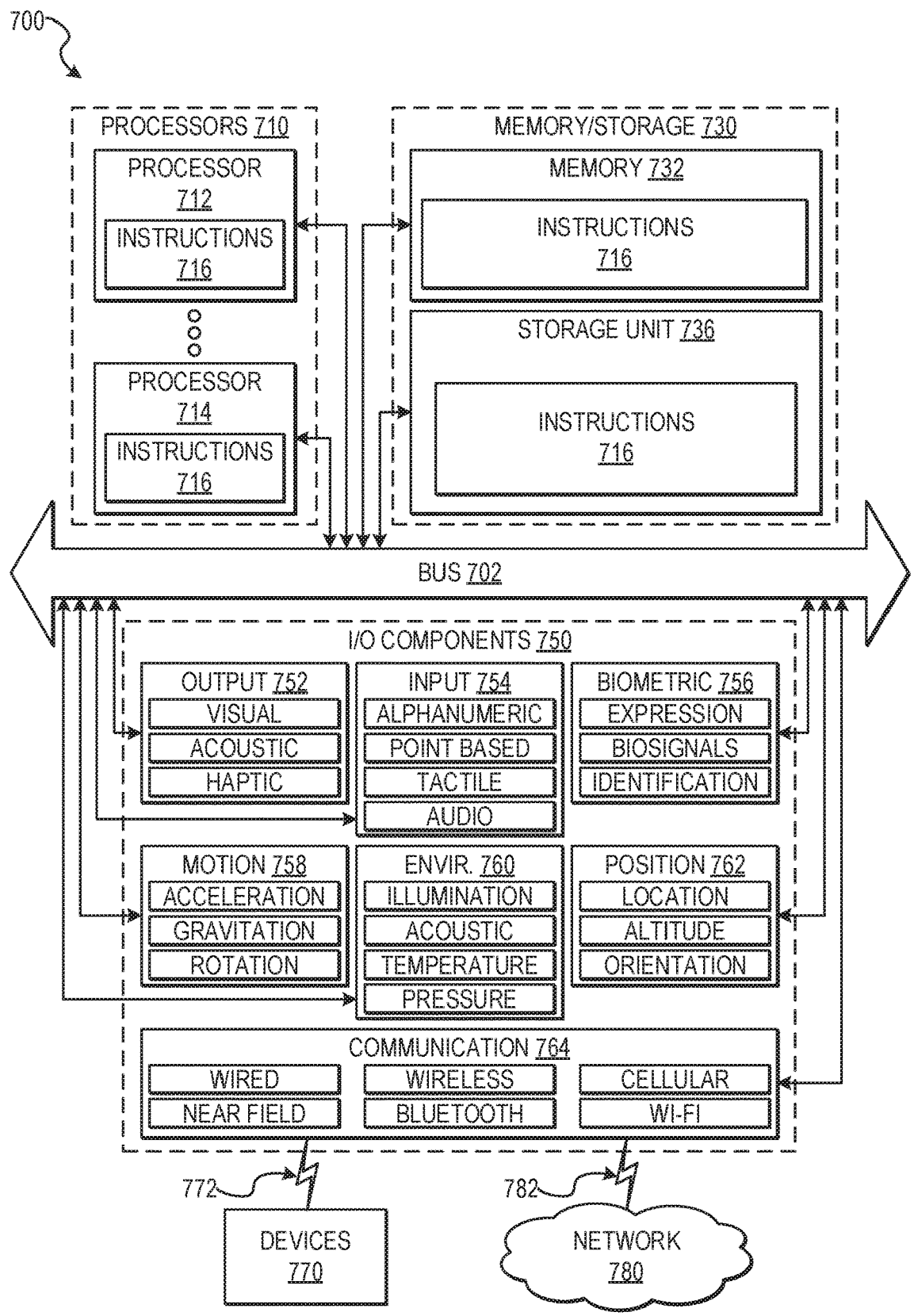
FIG. 7 is a block diagram illustrating components of a machine able to read instructions from a machine-readable medium and perform any of the methodologies discussed herein, according to an example embodiment.

As shown in FIG. 1, device 110A can also include additional applications, programs, modules, etc., such as meeting completion engine 118. Meeting completion engine can be an application stored in memory of device 110A (e.g. memory 730 as depicted in FIG. 7 and described below). One or more processor(s) of device 110A (e.g., processors 710 as depicted in FIG. 7 and described below) can execute the application. In doing so, device 110A can be configured to perform various operations, present content to user 130A, etc., as described herein. In certain implementations, meeting completion engine 118 can be a plug-in and/or a standalone application that operates together/in conjunction with collaboration engine 116. As described herein, meeting completion engine 118 can configure device 110A to process various message(s) (e.g., email messages generated with respect to a meeting) and track the performance of various related action items.

It should also be noted that while various components (e.g., meeting completion engine 118) are depicted and/or described as operating on a device 110A, this is only for the sake of clarity. However, in other implementations the referenced components (e.g., meeting completion engine 118) can also be implemented on other devices/machines. For example, in lieu of executing locally at device 110A, meeting completion engine 118 can be implemented remotely (e.g., on a server device or within a cloud service or framework), as described herein. By way of illustration, meeting completion 118 can also execute on server 140 (as shown in FIG. 1), and the various operations described herein can be performed/implemented at the server.

As also shown in FIG. 1, devices 110 can connect to and/or otherwise communicate with server 140 via network 120. Network 120 can include one or more networks such as the Internet, a wide area network (WAN), a local area network (LAN), a virtual private network (VPN), an intranet, and the like.

Server 140 can be, for example, a server computer, computing device, storage service (e.g., a 'cloud' service), etc., and can include meeting completion engine 118, log 144, and content repository 160. As described in greater detail below, log 144 can be, for example, a database or repository that stores various information, including but not limited to records pertaining to the manner in which a user completes an action item. Content repository 160 can be, for example, a database or repository that stores various content items (documents, files, etc.) such as content item 150A and content item 150B (collectively, content items 150). Such content item(s) 150 can be associated with various users, action items, meetings, etc. (as reflected, for example, in metadata stored with the content item), as described herein.

Figure 2:
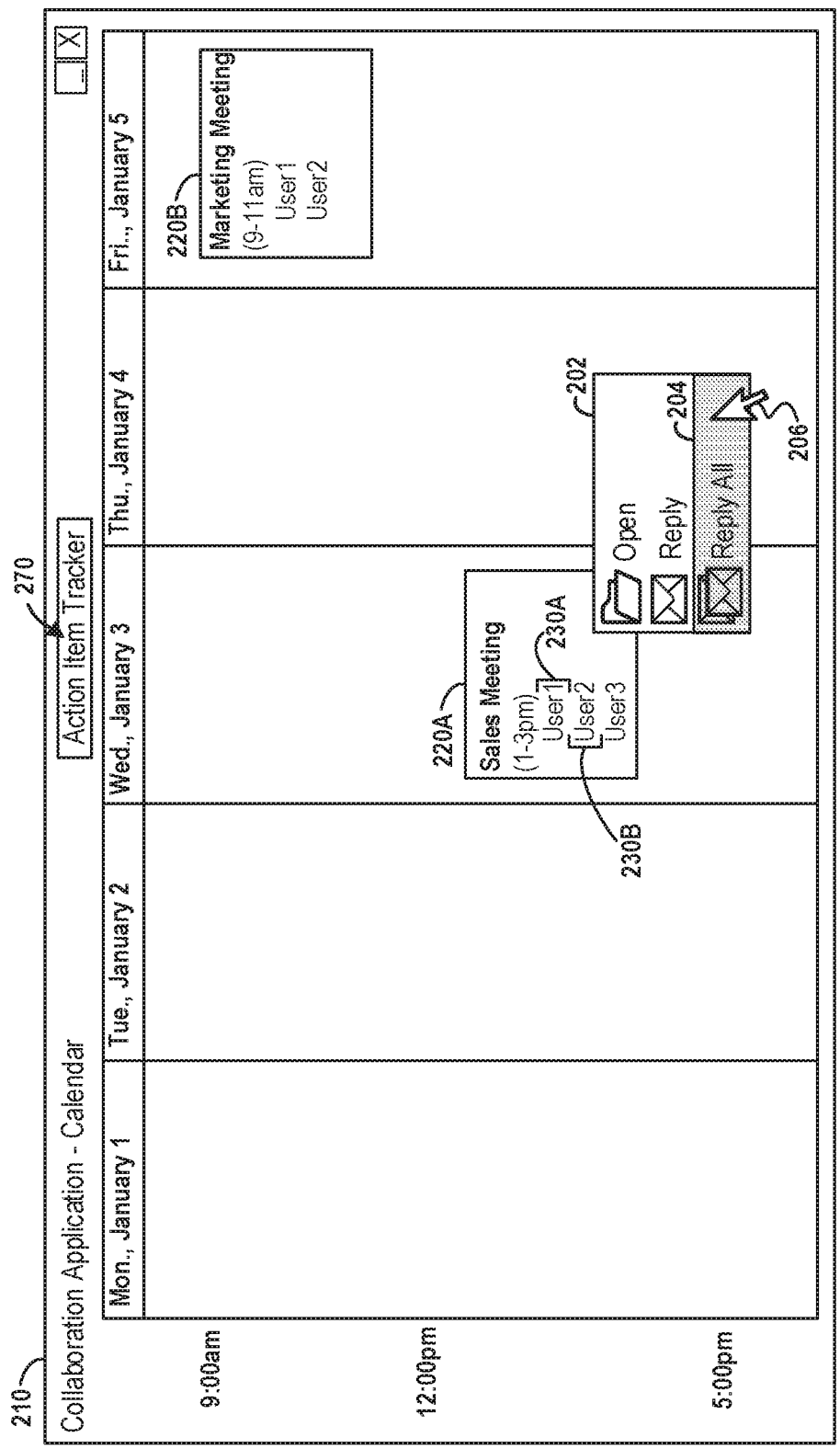
FIG. 2 illustrates an example scenario described herein, according to an example embodiment.

FIG. 2 depicts an example user interface 210 of collaboration application 116, such as may be presented to user 130A at device 110A. As shown in FIG. 2, interface 210 presents a calendar application within which information pertaining to various meetings such as meeting 220A ('Sales Meeting') and meeting 220A ('Marketing Meeting') (collectively, meeting(s) 220) is presented. Such meetings 220 can be entrie(s) within the calendar application that reflect scheduling information, location information, participant information, and/or other information related to an event, meeting, etc. For example, meeting 220A ('Sales Meeting') is scheduled for Wednesday, January 3$^{rd}$ and includes various users such as user 230A ('User1'), user 230B ('User2'), etc. that are invited to or otherwise associated with the meeting.

Figure 3:
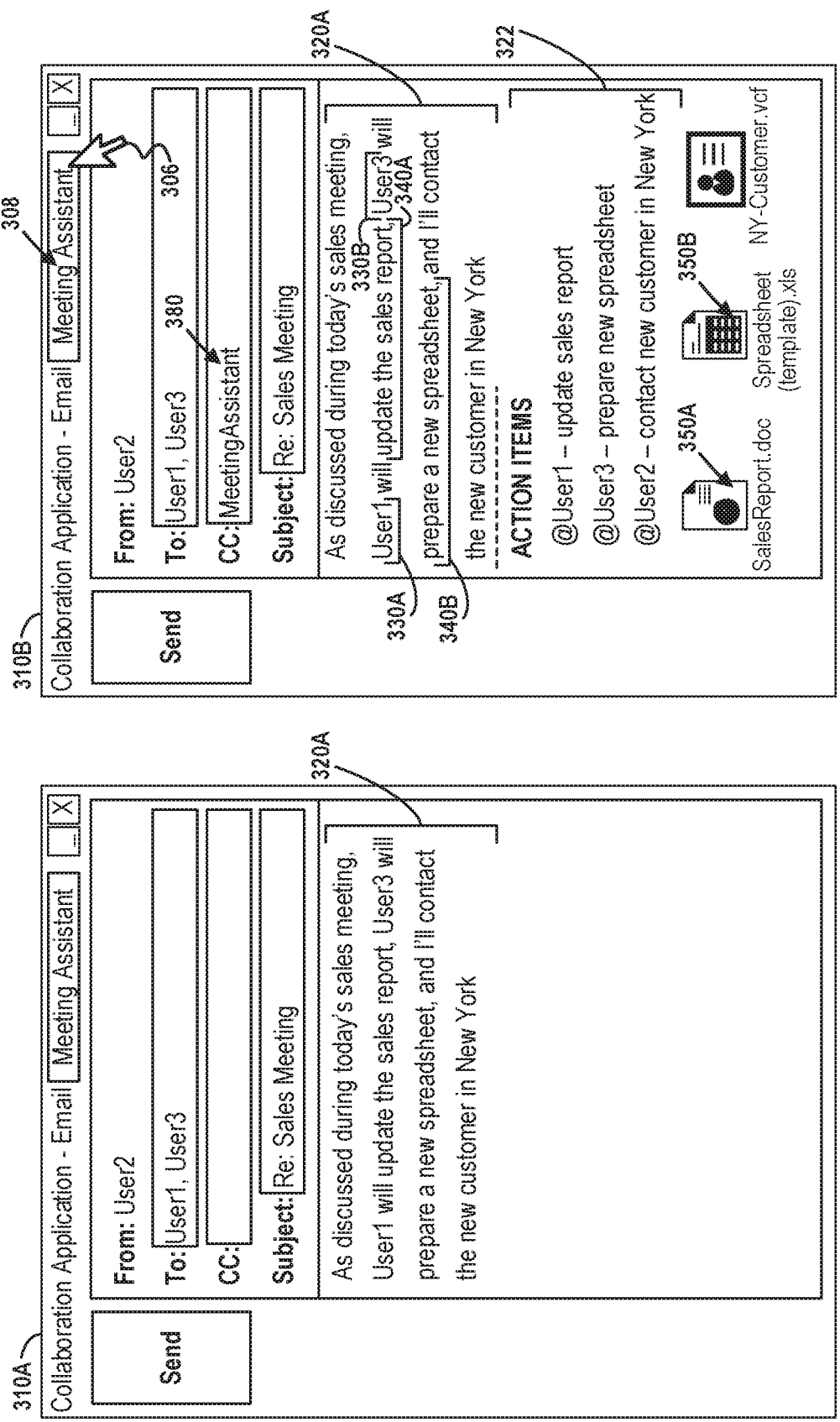
FIGS. 3A and 3B illustrate example scenarios described herein, according to an example embodiment.

As also shown in FIG. 2, collaboration application 116 can enable user 130A to initiate various operations with respect to a meeting 220. For example, user 130A can select (e.g., via touch screen interaction, mouse click such as a 'right click' operation, etc.) meeting 220A. In response to such a selection, collaboration application 116 can present a menu such as context menu 202 to the user 130A. Such a menu 202 can include an option 204 ('Reply All') that causes a message (e.g., an email) to be generated with respect/in relation to meeting 220A. In certain implementations, upon selecting such an option 204 (e.g., by hovering pointer 206 over the region associated with option 204 and clicking or otherwise selecting such an option), an email (originating from user 130A and directed to the various other users associated with meeting 220A) can be generated. An example of such an email is depicted in FIG. 3A.

FIG. 3A depicts an example user interface 310A of collaboration application 116, such as may be presented to user 130A at device 110A. For example, in response to a selection of option 204 ('Reply All') as shown in FIG. 2, collaboration application 116 can launch or present interface 310A. Doing so can enable the user to compose a message associated with the selected meeting (here, meeting 220A). By way of illustration, after participating in a meeting one of the participants can initiate subsequent communication(s) with other participant(s) (and/or other related parties), e.g., to ensure that action items and other tasks discussed during the meeting are completed.

For example, in the scenario depicted in FIG. 3A, 'User2' has selected option 204 ('Reply All,' as shown in FIG. 2) with respect to meeting 220A ('Sales Meeting'). As shown in FIG. 3A, interface 310A can then be presented to User2 (e.g., by collaboration application 116). Such an interface 310A can be a 'compose email' interface which can be populated with information from the corresponding meeting 220A. As shown in FIG. 3A, the email (being composed by User2) can be directed (in the 'To:' field) to the other participants in the meeting 220A (here, User1 and User3) and can be associated (e.g., in the 'Subject:' field) with the title, name, etc., of the meeting. Within such an interface 310A, User2 can, for example, compose a message directed to the meeting participants. Such a message can, for example, summarize the outcome of the meeting, next steps to be taken, follow up items, etc., such as message 320A as shown in FIG. 3A.

Having composed message 320A (as shown in FIG. 3A), a user (e.g., User2 in the above example) can initiate or activate meeting completion engine 118. For example, in certain implementations meeting completion engine 118 can be initiated in response to a user selection of a selectable control (e.g., a button, etc.) that can be integrated within an interface of collaboration application 116 (e.g., button 308 as shown in FIG. 3B). Meeting completion engine 118 can then process various aspects of message 320A and initiate various additional operations, as described herein.

In certain implementations, meeting completion engine 118 can utilize natural language processing (NLP) and/or other such content processing techniques to process messages, content, etc., as described herein. Additionally, as shown in FIG. 3B, upon selection of button 308, an identifier 380 corresponding to meeting completion engine 118 (e.g., an email address, such as 'MeetingAssistant,' as shown) can be inserted into interface 310B (e.g., into the 'CC:' field). Such an identifier can enable subsequent communications (e.g., replies from various users that contain status updates) to be directed to and/or received (and processed) by meeting completion engine 118.

As shown in FIG. 3A, meeting completion engine 118 can process message 320A ("As discussed during today's sales meeting . . . ") to identify various user(s) that are mentioned and/or referenced within the message. By way of illustration, message 320A can be processed to identify user 330A ('User1'), user 330B ('User2'), etc., mentioned within the message. Additionally, in certain implementations message 320A can be processed to identify various action item(s) that are mentioned and/or referenced within the message. Such action items can be, for example, tasks or other such items that are to be performed or completed. By way of illustration, message 320A can be processed to identify action item 340A ('update the sales report'), action item 340B ('prepare a new spreadsheet'), etc., mentioned within the message.

The various elements referenced herein (e.g., users and action items) should be understood to be provided merely by way of example. Accordingly, meeting completion engine 118 can also identify various additional elements within a message. For example, meeting completion engine 118 can further identify due dates mentioned within a message (e.g., with respect to a particular action item).

Additionally, in certain implementations meeting completion engine 118 can identify various associations between identified elements. For example, in addition to identifying various user(s) and action item(s) within a message, meeting completion engine 118 can further identify an association between a user and an action item. By way of illustration, as shown in FIG. 3B, meeting completion engine 118 can identify (e.g., using NLP) an association between user 330A ('User1') and action item 340A ('update the sales report'). In doing so, the referenced action item can be assigned to the user to which it is associated, and meeting completion engine 118 can further track performance of the action item by the associated user, as described herein.

As also shown in FIG. 3B, meeting completion engine 118 can generate and/or insert various supplemental content (e.g., into the email being composed). For example, meeting completion engine 118 can generate supplemental content 322 ('ACTION ITEMS . . . ') which can reflect or include a summary or list of the various identified users and the respective action item(s) assigned to each one. Such supplemental content 322 can be inserted into the referenced email being composed (e.g., after/below message 320A). Various subsequent follow-up notifications, etc., can update this summary/list to reflect the status of various action items, as described herein.

Moreover, in certain implementations meeting completion engine 118 can identify various content items (e.g., documents, links, etc.) that are related to/associated with an action item. For example, meeting completion engine 118 can identify (e.g., using NLP) various documents that are referenced within message 320A in relation to an action item. Such content items (and/or links to the content item(s)) can then be incorporated (e.g., attached or inserted) into the email being composed. By way of illustration, meeting completion engine 118 can identify that action item 340A ('update . . . ') references content item 350A ('SalesReport.doc') and action item 340B ('prepare . . . ') references content item 350B ('Spreadsheet (template).xls'). Such identified content items can be incorporated (e.g., attached/linked) into the email being composed, as shown in FIG. 3B.

In certain implementations, the referenced content item(s) can be identified within and/or retrieved/received from content repository 160 (as shown in FIG. 1). Content repository 160 can be, for example, a database or repository (e.g., on server 140) that stores various content items such as content item 150A and content item 150B (collectively, content items 150). Such content items 150 can include documents, files, etc. Content repository can also store additional information such as metadata associated with a content item (or such metadata can be included or incorporated within the content item itself). Such metadata can reflect, for example, various associations or relationships between a content item and various other elements (e.g., users, action items, meetings, etc.). By way of illustration, metadata associated with a particular document can reflect a user that composed/created the document, a user that recently accessed the document, etc. Accordingly, meeting completion engine 118 can utilize such metadata/information in identifying content item(s) related to/associated with an action item. For example, in the scenario depicted in FIG. 3B, a content item entitled 'SalesReport.doc' that is associated (as determined based on corresponding metadata) with 'User1' (and/or another participant in the meeting, e.g., 'User2') can be determined to be likely to be relevant to the identified action item. In contrast, another document within content repository 160 (e.g., 'MonthlySalesReport.doc') that is not otherwise associated with any meeting participants, etc., can be determined to be relatively less likely to be relevant to the action item/meeting.

In various implementations, meeting completion engine 118 can also identify, retrieve, and/or receive the referenced content item(s) from various services such as service 128A and service 128B (collectively services 128), as shown in FIG. 1. Such services can be, for example, third-party services that enable the retrieval of content (e.g., business names, addresses, phone numbers, documents, files, etc.) that may enhance or otherwise be relevant to certain operations described herein. In certain implementations meeting completion engine 118 can transmit and/or receive content, instructions, etc. to/from such services via an application programming interface (API).

After the message/email (e.g., as depicted in FIG. 3B) is sent (e.g., to the participants in a meeting), meeting completion engine 118 can track the performance of the various action items by the respective users. As noted above, in certain implementations users can compose and send reply emails (e.g., containing the word 'completed') to an email address associated with meeting completion engine 118. Meeting completion engine 118 can then process/parse such email(s) and maintain an updated status of the performance of each action item. Additionally, in certain implementations meeting completion engine 118 can generate, transmit, and/or otherwise provide various notification(s). Such notifications can update the user(s) with respect to the status of various action item(s) and/or facilitate the completion of such action item(s).

Figure 4:
FIGS. 4A and 4B illustrate example scenarios described herein, according to an example embodiment.

By way of illustration, FIG. 4A depicts an example email notification 410A that can be generated and/or provided by meeting completion engine 118 to track the performance of various action items. As shown in FIG. 4A, email 410A can include message 420A which reflects the status of the various action items (e.g., as updated with respect to summary/list in supplemental content 322 as shown in FIG. 3B).

By way of further illustration, FIG. 4B depicts an example email notification 410B that can be generated and/or provided by meeting completion engine 118 to track the performance of various action items. As shown in FIG. 4B, email 410B can include message 420B which includes content that can enable the user to complete an assigned action item (e.g., 'Click below . . . ,' together with a content item 450A associated with the action item).

In certain implementations, various aspect of the manner in which a user completes an assigned action item (and/or otherwise responds to various notification(s)) can be stored in a log (e.g., log 144 as depicted in FIG. 1). Log 144 can be, for example, a database or repository that stores various information, including but not limited to records pertaining to the manner in which a user completes an action item (e.g., the amount of time that elapses until such action item is completed) and/or responds to various notification(s). In doing so, meeting completion engine 118 can identify (e.g., using various machine-learning techniques) various operations, preferences, etc. of a particular user, and subsequently utilize such determinations with respect to subsequent action item(s).

For example, in one scenario meeting completion engine 118 can initially transmit/provide a notification to user as depicted in FIG. 4A (e.g., including a request to complete an assigned action item and a status update showing that other users have completed their action items). Upon determining that the user has still not completed the assigned action item (e.g., after 48 hours), another notification as depicted in FIG. 4B (e.g., including an attachment/link enabling the user to directly complete the action item) can be provided to the user. Upon determining that the user completed the action item after the second notification (as reflected in the records of log 144), subsequent notification(s) generated/provided by meeting completion engine 118 to the referenced user can reflect the format of the notification as depicted in FIG. 4B. In doing so, meeting completion engine 118 can utilize the tendencies, etc., of a particular user to provide notification(s) in a manner that are most effective in enabling the user to complete assigned action item(s).

The email notifications shown in FIGS. 4A and 4B are provided herein only by way of example. Accordingly, various other types of notifications can also be employed. For example, the described notifications can be implemented as push notifications, pop-up notifications, other types of reminders, etc.

Figure 5:
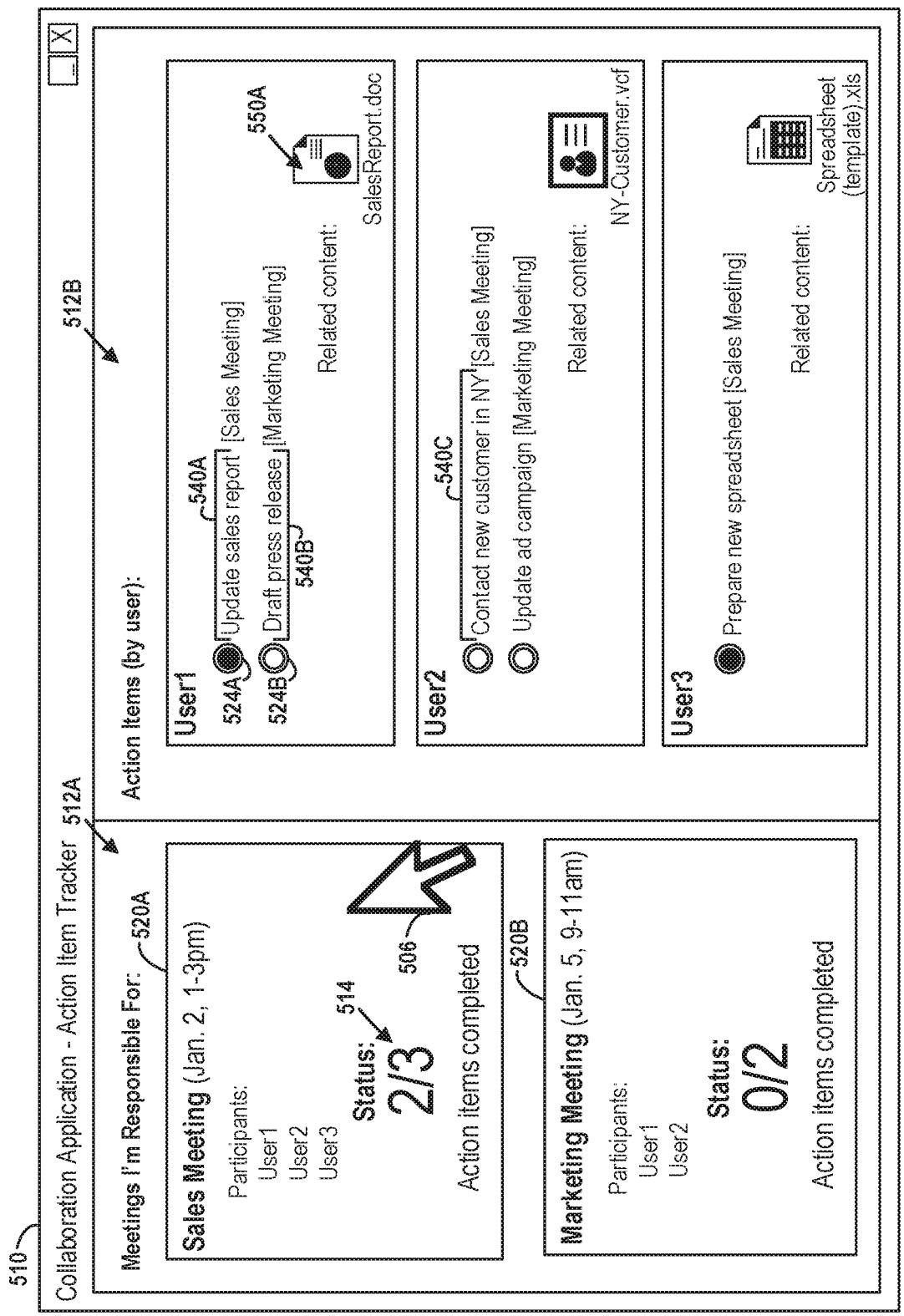
FIG. 5 illustrates an example scenario described herein, according to an example embodiment.

FIG. 5 depicts an action tracking interface 510 within which meeting completion engine 118 can present/display the status associated with various action items and other related information. In certain implementations, action tracking interface 510 can be accessed by a user (e.g., 'User2,' who is the user that initiated the meeting follow up email in the example above) via a selectable control (e.g., button 270 as shown in FIG. 2).

As shown in FIG. 5, action tracking interface 510 can include various sections or regions such as region 512A and region 512B. Region 512A can include information pertaining to various meetings a user is responsible for (e.g., meeting 520A and meeting 520B, as shown). For example, an entry for a particular meeting (e.g., meeting 520A) can reflect the status 514 of the completion of the various action items associated with such a meeting. By way of illustration, as shown in FIG. 5, the status of meeting 520A ('Sales Meeting') reflects that two out of three action items have been completed. Various other status information can also be provided.

Upon selecting a particular meeting from within region 512A (e.g., by clicking on meeting 520A using pointer 506), meeting completion engine 118 can present additional details and information within region 512B of action tracking interface 510. As shown in FIG. 5, region 512B can depict a detailed breakdown for each user that is a participant in the selected meeting (e.g., 'User1,' 'User2,' etc.).

For example, with respect to 'User1,' region 512B of action tracking interface 510 can depict various action items assigned to the user, as well as their respective completion status. As shown with respect to 'User1,' action item 540A ('Update . . . ') associated with the selected meeting (meeting 520A—'Sales Meeting') is displayed, as well as action item 540B ('Draft . . . ') associated with another meeting (meeting 520B—'Marketing Meeting'). By presenting action items that originate from multiple meetings, the viewer (here, 'User2,' who initiated the follow up for 'Sales Meeting') can account for additional action items assigned to User1 (e.g., with respect to other meetings), e.g., in assessing the capabilities, etc., of the user to complete a particular action item. Corresponding content items (e.g., content item 550A) can also be incorporated within action tracking interface 510, as shown. Additionally, various icons and/or selectable controls can depict the status of each action item. For example, icon/control 524A (which reflects a 'selected' state) can depict that a particular action item has been completed, while icon/control 524B can depict that a particular action item has not been completed. Such icons/controls can be selected (e.g., clicked on, etc.) within action tracking interface 510 to change the status of the corresponding action item.

While various examples described herein are illustrated with respect to a single device (e.g., device 110A) and/or server (e.g., server 140), this is simply for the sake of clarity and brevity. However, it should be understood that the described technologies can also be implemented (in any number of configurations) across multiple devices, servers, services, etc.

Further aspects and features of device 110 and server 140 are described herein in conjunction with FIGS. 2-7.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 6:
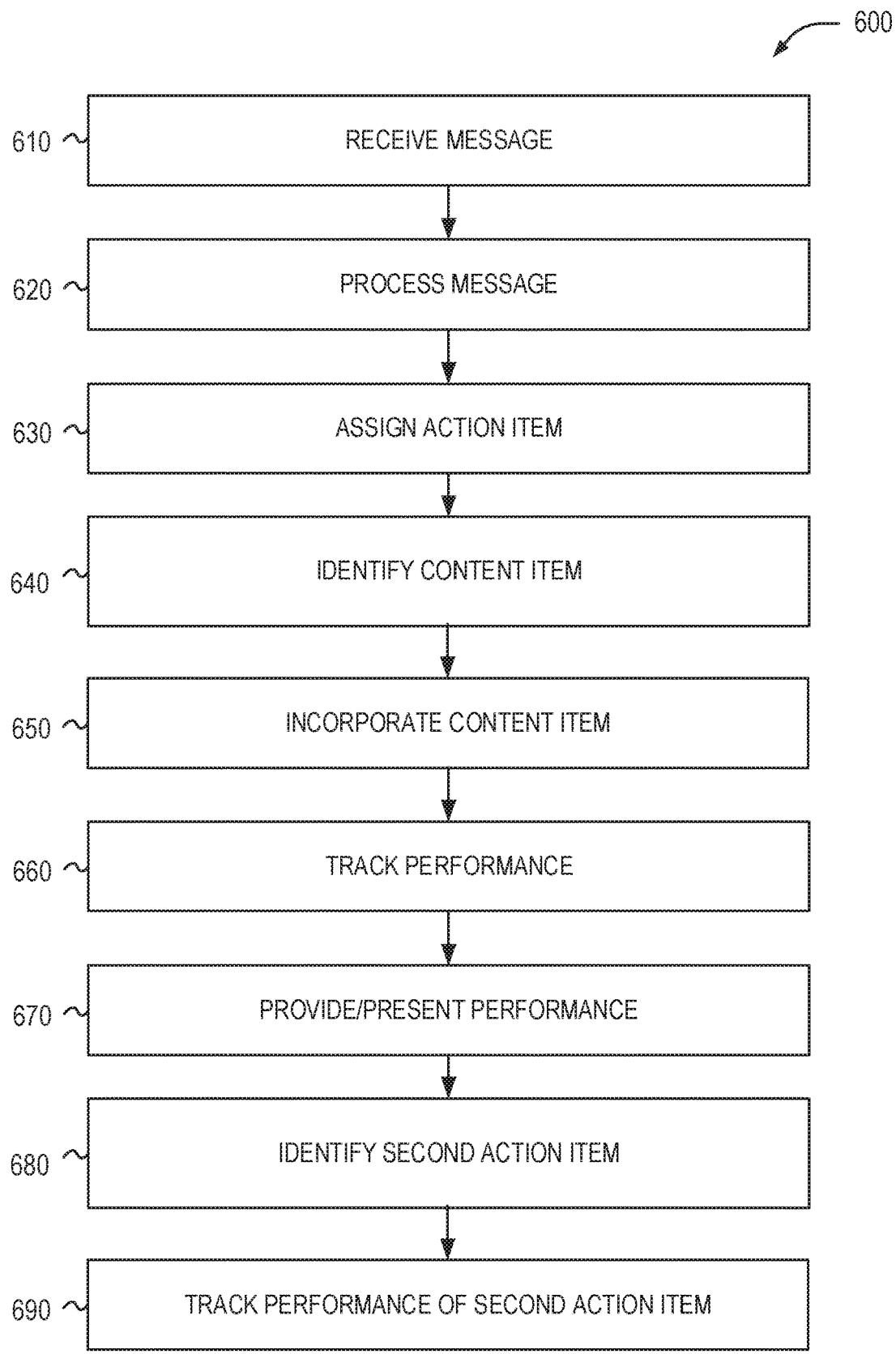
FIG. 6 is a flow chart illustrating a method, in accordance with an example embodiment, for meeting completion.

FIG. 6 is a flow chart illustrating a method 600, according to an example embodiment, for meeting completion. The method is performed by processing logic that can comprise hardware (circuitry, dedicated logic, etc.), software (such as is run on a computing device such as those described herein), or a combination of both. In one implementation, the method 600 is performed by one or more elements depicted and/or described in relation to FIG. 1 (including but not limited to meeting completion engine 118, e.g., as executing on device 11A and/or server 140), while in some other implementations, the one or more blocks of FIG. 6 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 610, a message is received. In certain implementations, such a message (e.g., an email) can be composed or generated in relation to a meeting. Such a meeting can include or otherwise reflect or correspond to a scheduling entry within a calendar application. For example, FIG. 2 depicts an example meeting 220A ('Sales Meeting'). In response to the selection of the 'Reply All' option 204 with respect to meeting 220A, a user can begin to compose/generate message 320A as shown in FIG. 3A. Upon selecting button 308 ('Meeting Assistant'), such a message 320A can be provided to/received by meeting completion engine 118.

In certain implementations, various aspects of operation 610 (as well as the other operations described with respect to FIG. 6 and/or described herein) are performed by device 110A (e.g., in conjunction with meeting completion engine 118). In other implementations, various aspects of operation 610 (as well as the other operations described with respect to FIG. 6 and/or described herein) are performed by server 140 (e.g., in conjunction with meeting completion engine 118). In yet other implementations, such aspects can be performed by one or more other elements/components, such as those described herein.

At operation 620, the message (e.g., as received at operation 610) is processed. In doing so, an action item and/or a user (e.g., a user associated with the action item) can be identified. In certain implementations, the message can be processed using NLP and/or other such techniques to identify the action item(s), user(s), etc. mentioned/referenced within the message. For example, as shown in FIG. 3B, meeting completion engine 118 can process message 320A ("As discussed during today's sales meeting . . . ") to identify various user(s) and/or action item(s) that are mentioned and/or referenced within the message.

At operation 630, an action item (e.g., as identified at operation 620) is assigned to a user. For example, associations can be identified between user(s) and action item(s) that are identified within the message. For example, as shown in FIG. 3B, user 330A ('User1') can be identified as being associated with action item 340A ('update the sales report').

Additionally, in certain implementations supplemental content is inserted (e.g., by meeting completion engine 118 as executing on device 110A) into a message. In other implementations, such supplemental content can be provided (e.g., by meeting completion engine 118 as executing on server 140). The referenced supplemental content can correspond to or reflect the assigning of certain action item(s) to certain user(s). For example, FIG. 3B depicts supplemental content 322 ('ACTION ITEMS . . . ') which can reflect or include a summary or list of various identified users and respective action item(s) assigned to each one. Such supplemental content 322 can be inserted an email being composed with respect to the corresponding meeting, as shown.

At operation 640, a content item is identified. In certain implementations, such a content item can be identified as being related to one or more action item(s) (such as those identified at operation 620). Such content item can be, for example, a file, document, link, etc. In certain implementations the content item can be identified as being related to a particular action item based on an association between the content item and a particular user (e.g., the user assigned to the corresponding action item). In other implementations the content item can be identified as being related to a particular action item based on an association between the content item and another user (e.g., another participant in the meeting from which the referenced action item originated). For example, as illustrated above, a content item associated with one participant in a meeting can be determined to be likely to be relevant to an action item assigned to another participant in the same meeting.

At operation 650, the content item (e.g., as identified at 640) is incorporated. In certain implementations, such a content item can be incorporated (e.g., attached, linked to, etc.) within the message (e.g., the message received at operation 610). For example, as shown in FIG. 3B, various content items 350A, 350B, etc., can be incorporated/attached within the message. It should be noted that while FIG. 3B depicts multiple content items 350A, 350B, etc. attached, in certain implementations only those content items that are relevant to a particular user can be incorporated/provided in an email directed to such user.

At operation 660, performance of an action item (e.g., as identified at operation 620) is tracked. In certain implementations, various updates regarding the performance of the action item can be received. Such updates can be received via messages, replies, etc., received from various users via an identifier/email address associated with meeting completion engine 118 (e.g., identifier 380—'MeetingAssistant'—as shown in FIG. 3B). In other implementations such updates can be received via inputs provided by such user(s) via an action tracking interface, such as interface 510 as depicted in FIG. 5. For example, a user can select a button (e.g., button 524A) that corresponds to an action item in order to update the status of such an action item (e.g., to 'completed').

The referenced updates, status of action items, etc., can be provided as notification(s) to various user(s) (e.g., the user responsible for a particular action item, the user that initiated the email in response to the meeting, etc.). FIGS. 4A and 4B depict various types of notifications that can be generated, provided, presented, etc. to such user(s), as described in detail above.

At operation 670, performance of various action item(s) (e.g., as tracked at operation 660) can be providing and/or presented. In certain implementations, such performance can be provided to and/or presented within an action tracking interface. Such an action tracking interface (e.g., interface 510 as shown in FIG. 5) can be, for example, an interface that depicts various meetings and information pertaining to the status of action item(s) associated with such meetings.

At operation 680, another action item is identified. Such an action item can be another action item (e.g., associated with a second meeting) assigned to a particular user (e.g., a user that was also a participant in a first meeting). For example, as shown in FIG. 5, User1 who is associated with action item 540A ('Update . . . ') which originated from 'Sales Meeting' can also be associated with another action item 540B ('Draft . . . ') that originated from 'Marketing Meeting.'

At operation 690, performance of the second action item (e.g., the action item identified at operation 680) is tracked. As noted above, in certain implementations the manner in which performance of such a second action item is tracked can be dictated or adjusted based on feedback, results, etc., identified with respect to the performance of a first action item by the user. For example, upon determining that a particular user previously completed an action item in response to a particular type of notification, subsequent notification(s) generated/provided by meeting completion engine 118 to such user can reflect the format of the notification to which the user was responsive to. In doing so, meeting completion engine 118 can utilize the tendencies, etc., of a particular user to provide notification(s) in a manner that are most effective in enabling the user to complete assigned action item(s).

It should also be noted that while the technologies described herein are illustrated primarily with respect to meeting completion, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-6 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 7 is a block diagram illustrating components of a machine 700, according to some example implementations, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein can be executed. The instructions 716 transform the general, non-programmed machine into a particular machine programmed to carry out the described and illustrated functions in the manner described. In alternative implementations, the machine 700 operates as a standalone device or can be coupled (e.g., networked) to other machines. In a networked deployment, the machine 700 can operate in the capacity of a server machine or a client machine in a server-client network environment, or as a peer machine in a peer-to-peer (or distributed) network environment. The machine 700 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 can include processors 710, memory/storage 730, and I/O components 750, which can be configured to communicate with each other such as via a bus 702. In an example implementation, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 712 and a processor 714 that can execute the instructions 716. The term "processor" is intended to include multi-core processors that can comprise two or more independent processors (sometimes referred to as "cores") that can execute instructions contemporaneously. Although FIG. 7 shows multiple processors 710, the machine 700 can include a single processor with a single core, a single processor with multiple cores (e.g., a multi-core processor), multiple processors with a single core, multiple processors with multiples cores, or any combination thereof.

The memory/storage 730 can include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 can also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions (e.g., instructions 716) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine (e.g., processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 can include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 can include many other components that are not shown in FIG. 7. The I/O components 750 are grouped according to functionality merely for simplifying the following discussion and the grouping is in no way limiting. In various example implementations, the I/O components 750 can include output components 752 and input components 754. The output components 752 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 750 can include biometric components 756, motion components 758, environmental components 760, or position components 762, among a wide array of other components. For example, the biometric components 756 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 can include acceleration sensor components (e.g., accelerometer), gravitation sensor components, rotation sensor components (e.g., gyroscope), and so forth. The environmental components 760 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 762 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 750 can include communication components 764 operable to couple the machine 700 to a network 780 or devices 770 via a coupling 782 and a coupling 772, respectively. For example, the communication components 764 can include a network interface component or other suitable device to interface with the network 780. In further examples, the communication components 764 can include wired communication components, wireless communication components, cellular communication components, Near Field Communication (NFC) components. Bluetooth® components (e.g., Bluetooth® Low Energy), Wi-Fi® components, and other communication components to provide communication via other modalities. The devices 770 can be another machine or any of a wide variety of peripheral devices (e.g., a peripheral device coupled via a USB).

Moreover, the communication components 764 can detect identifiers or include components operable to detect identifiers. For example, the communication components 764 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 764, such as location via Internet Protocol (IP) geolocation, location via Wi-Fi® signal triangulation, location via detecting an NFC beacon signal that can indicate a particular location, and so forth.

In various example implementations, one or more portions of the network 780 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 can include a wireless or cellular network and the coupling 782 can be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA). Worldwide Interoperability for Microwave Access (WiMAX), Long Term Evolution (LTE) standard, others defined by various standard-setting organizations, other long range protocols, or other data transfer technology.

The instructions 716 can be transmitted or received over the network 780 using a transmission medium via a network interface device (e.g., a network interface component included in the communication components 764) and utilizing any one of a number of well-known transfer protocols (e.g., HTTP). Similarly, the instructions 716 can be transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
a processing device; and
a memory coupled to the processing device and storing instructions that, when executed by the processing device, cause the system to perform operations comprising:
causing generation, via a graphical user interface of a collaboration application, of a first message in relation to a meeting, wherein the first message is an electronic message composed by a first user and the first message is directed to a second user;
detecting a selection of a meeting assistant button on the graphical user interface;
based on detecting the selection of the meeting assistant button, causing communication of the first message to a meeting completion engine;
accessing, at the meeting completion engine, the first message, wherein the first message comprises a plurality of action items in a body portion of the first message;
processing, by a natural language process of the meeting completion engine, the first message to identify a first action item and a first action item user associated with the first action item referenced in the first message;
assigning the first action item to the first action item user;
based on assigning the first action item to the first action item user, generating, by the meeting completion engine, supplemental content comprising a listing of an assignment of the first action item to the first action item user;
identifying an attached file or a linked file associated with the first action item;
generating an action tracking message based on incorporating the supplemental content and the attached file or linked file into the first message;
causing display of the action tracking message within the graphical user interface of the collaboration application prior to transmission of the action tracking message;
receiving an indication to transmit the action tracking message; and
based on receiving the indication to transmit the action tracking message, transmitting, over a communications network, the action tracking message to the second user to cause display of the action tracking message at a second graphical user interface of the collaboration application associated with the second user.

2. The system of claim 1, wherein accessing the first message associated with the meeting is based on receiving a user selection of a selectable control that is integrated into a user interface of the meeting completion engine, wherein the selectable control activates the meeting completion engine for processing the first message.

3. The system of claim 1, wherein the memory further stores instructions for causing the system to perform operations comprising:
identifying a second action item assigned to the first user; and
tracking performance of the second action item by the first user based on the performance of the first action item by the first user.

4. The system of claim 1, wherein the memory further stores instructions for causing the system to perform operations comprising tracking performance of the first action item by the first action item user based on the performance of the first action item by the first action item user.

5. The system of claim 1, wherein the memory further stores instructions for causing the system to perform operations comprising incorporating the supplemental content and the attached file or linked file into the first message, wherein incorporating the supplemental content and the attached file or linked file into the first message comprises inserting the supplemental content and the attached file or linked file above and/or below the first message within the graphical user interface of the collaboration application.

6. The system of claim 1, further comprising a first device comprising the meeting completion engine, and a second device comprising the collaboration application, wherein the first device and the second device communicate via the communications network.

7. The system of claim 1, wherein processing the first message further comprises processing the first message to identify the first action item user associated with the meeting and wherein identifying the supplemental content and the attached file or linked file comprises identifying the supplemental content and the attached file or linked file related to the first action item based on an association between the supplemental content and the attached file or linked file and the first action item user.

8. The system of claim 1, the memory further stores instructions for causing the system to perform operations comprising:
processing the first message to generate performance tracking data that identifies associations between elements in the first message, the elements comprising two or more of the following: meeting information, scheduling information, location information, and participant information;
tracking performance of the first action item by the first user, wherein tracking the performance of the first action item comprises parsing the performance tracking data and a reply message from the first user to generate a status indicator that the first action item has been completed; and
causing presentation of, within an action tracking interface, the status indicator and the performance tracking data of the first action item by the first user.

9. The system of claim 1, wherein the memory further stores instructions for causing the system to perform operations comprising:
generating a notification that tracks performance of the first action item, wherein the notification comprises a message that includes content to enable the first user to complete the first action item.

10. A computerized method comprising:
causing generation, via a graphical user interface of a collaboration application executed by a processor, of a first message in relation to a meeting, wherein the first message is an electronic message composed by a first user and the first message is directed to a second user;
detecting, by the processor, a selection of a meeting assistant button on the graphical user interface;
based on detecting the selection of the meeting assistant button by the processor, causing communication of the first message to a meeting completion engine;
accessing, by the processor, at the meeting completion engine, the first message, wherein the first message comprises a plurality of action items in a body portion of the first message;
processing, by the processor, by a natural language process of the meeting completion engine, the first message to identify a first action item and a first action item user associated with the first action item referenced in the first message;
assigning, by the processor, the first action item to the first action item user;
based on assigning the first action item to the first action item user, generating, by the meeting completion engine, executed by the processor, supplemental content comprising a listing of an assignment of the first action item to the first action item user;
identifying, by the processor, an attached file or a linked file associated with the first action item;
generating, by the processor, an action tracking message based on incorporating the supplemental content and the attached file or linked file into the first message;
causing display, by the processor, of the action tracking message within the graphical user interface of the collaboration application prior to transmission of the action tracking message;
receiving, by the processor, an indication to transmit, from the first user, the action tracking message; and
based on receiving the indication to transmit the action tracking message, transmitting, by the processor, over a communications network, the action tracking message to the second user causing display of the action tracking message at a second graphical user interface of the collaboration application associated with the second user.

11. The method of claim 10, further comprising:
processing, by the processor, the first message to generate performance tracking data that identifies associations between elements in the first message, the elements comprising two or more of the following: meeting information, scheduling information, location information, and participant information;
tracking, by the processor, performance of the first action item by the first action item user, wherein tracking the performance of the first action item comprises parsing the performance tracking data and a reply message from the first user to generate a status indicator that the first action item has been completed; and
causing, by the processor, presentation of, within an action tracking interface, the status indicator and the performance tracking data of the first action item by the first action item user.

12. The method of claim 10, wherein the natural language processing of the first message further comprises processing, by the processor, the first message to identify the second user associated with the meeting, and wherein identifying the attached file or the linked file associated with the first action item based on an association between the attached file or the linked file associated with the first action item and the second user.

13. The method of claim 10, further comprising:
identifying, by the processor, a second action item assigned to the first user; and
tracking, by the processor, performance of the second action item by the first user based on the performance of the first action item by the first user.

14. The method of claim 10, further comprising:
subsequent to the transmission of the first message to the second user, tracking, by the processor, an indication of performance of the first action item by the first action item user at least in part by processing one or more electronic messages received in response to the first message; and
presenting, by the processor, the indication of performance of the first action item by the first action item user within an action tracking interface.

15. A non-transitory computer readable medium having instructions stored thereon that, when executed by a processing device, cause the processing device to perform operations comprising:
causing generation, via a graphical user interface of a collaboration application executed by the processing device, of a first message in relation to a meeting, wherein the first message is an electronic message composed by a first user and the first message is directed to a second user;
detecting a selection of a meeting assistant button on the graphical user interface;
based on detecting the selection of the meeting assistant button, causing communication of the first message to a meeting completion engine;
accessing, at the meeting completion engine executed by the processing device, the first message, wherein the first message comprises a plurality of action items in a body portion of the first message;

processing, by a natural language process of the meeting completion engine, the first message to identify a first action item and a first action item user associated with the first action item referenced in the first message;

assigning the first action item to the first action item user;

based on assigning the first action item to the first action item user, generating, by the meeting completion engine, supplemental content comprising a listing of an assignment of the first action item to the first action item user;

identifying an attached file or a linked file associated with the first action item;

generating an action tracking message based on incorporating the supplemental content and the attached file or linked file into the first message;

causing display of the action tracking message within the graphical user interface of the collaboration application prior to transmission of the action tracking message;

receiving, from the first user, an indication to transmit the action tracking message; and based on receiving the indication to transmit the action tracking message, transmitting, over a communications network, the action tracking message to the second user causing display of the action tracking message at a second graphical user interface of the collaboration application associated with the second user.

16. The computer-readable medium of claim 15, wherein the medium further stores instructions for causing the processing device to perform operations comprising:

identifying a second action item assigned to the first user; and tracking performance of the second action item by the first user based on the performance of the first action item by the first user.

17. The system of claim 1, wherein the memory further stores instructions for causing the system to perform operations comprising:

subsequent to the transmission of the first message, tracking an indication of performance of the first action item by the first action item user; and presenting the indication of performance of the first action item by the first action item user within an action tracking interface.

18. The system of claim 17, wherein tracking the indication of performance of the first action comprises:

receiving an update of the performance of the first action item; and providing a notification to the first user with respect to the first action item.

19. The system of claim 17, wherein the action tracking interface comprises an interface that depicts one or more action items associated with the meeting.

* * * * *